United States Patent [19]

Presby

[11] Patent Number: 4,932,989

[45] Date of Patent: Jun. 12, 1990

[54] METHOD AND APPARATUS FOR FABRICATING MICROLENSES ON OPTICAL FIBERS

[75] Inventor: Herman M. Presby, Highland Park, N.J.

[73] Assignee: AT&T Bell Laboratories, Murray Hill, N.J.

[21] Appl. No.: 333,230

[22] Filed: Apr. 5, 1989

[51] Int. Cl.$^5$ .................... C03B 37/025; C03B 21/02
[52] U.S. Cl. .......................................... 65/2; 65/3.11; 65/39; 65/40; 65/284; 65/61; 219/121.69; 219/121.73
[58] Field of Search .................. 65/37, 39, 40, 2, 3.11, 65/61, 284; 219/121.73, 121.82, 121.68, 121.69

[56] References Cited

U.S. PATENT DOCUMENTS

| | | | |
|---|---|---|---|
| 4,129,433 | 12/1978 | Jaeger et al. | 65/2 |
| 4,491,463 | 1/1985 | Weinstein et al. | 65/2 |
| 4,498,917 | 2/1985 | Weinstein et al. | 65/2 |
| 4,510,005 | 4/1985 | Nijman | 65/2 X |
| 4,565,558 | 1/1989 | Keil et al. | 65/1 |
| 4,589,897 | 5/1986 | Mathyssek | 65/2 |
| 4,710,605 | 12/1987 | Presby | 219/121 |
| 4,818,263 | 4/1989 | Mitch | 65/2 |
| 4,820,321 | 4/1989 | Presby | 65/2 |

OTHER PUBLICATIONS

U. C. Paek and A. L. Weaver, "Formation of a Spherical Lens at Optical Fiber Ends with a CO$_2$ Laser" Applied Optics, vol. 14, No, 2, Feb. 1975, pp. 294–298.
"Comparison Efficiency and Feedback Characteristics of Techniques for Coupling Semiconductor Lasers to Single Mode Fibers", *Applied Optics*, vol. 22, No 23, 12/1/83, G. Wenke et al., pp. 3837–3844.
"Fabrication and Investigation of Drawn Fiber Tapers with Spherical Microlenses", *Journal of Optical Communications*, vol. 6, No. 4 (Dec. 1985) K. Matyssek et al., pp. 142–146.
"Excimer Lasers Tackle Processing", *Photonics Spectra*, Jan. 1989, P. Helzer, pp. 112–114.
"Microlenses for Coupling Single Mode Fibers to Single-Mode Thin-Film Waveguides", *Applied Optics*, vol. 19, No. 17, Sep. 1, 1980, P. D. Bear, pp. 2906–2909.

Primary Examiner—Robert L. Lindsay
Attorney, Agent, or Firm—Oleg E. Alber

[57] ABSTRACT

This invention concerns with a process and apparatus for fabricating microlenses on optical fibers. A pulsed laser beam and an end portion of a fiber are arranged relative to each to another so that the laser beam is incident on the end portion of the fiber at an acute angle $\theta$ to the longitudinal axis of the fiber. The angle is selected to attain a desired curvature of a lens formed by ablation and heating of the end portion of the fiber by the laser beam. A movement of the fiber and the laser relative each to another results in progressive engagement of the end portion of the fiber with the laser for a preselected distance so as to produce a short taper with a lens at the end thereof. In the preferred embodiment, the fiber rotated about its axis within a passage of the holder which moves the end-portion of the fiber into and through the laser beam resulting in the said lens. The precise repeatability of the lens formation may be controlled by a computer.

37 Claims, 3 Drawing Sheets

METHOD AND APPARATUS FOR FABRICATING MICROLENSES ON OPTICAL FIBERS

TECHNICAL FIELD

The present invention relates to a method and apparatus for fabrication of microlenses on optical fibers.

BACKGROUND OF THE INVENTION

Optical fiber communication is a rapidly developing and maturing technology. Currently, optical fiber technology is being implemented in local area networks, long distance terrestrial systems and even longer distance submarine systems. As the area serviced by these communication systems expands, the number of fiber connections is also increasing, thus creating the need for improved fiber connections and couplers having low loss and minimal distortion. It is especially desirable to attain a maximum coupling efficiency of light from transmitters, such as semiconductor lasers, to microlensed fibers and from the microlensed fibers to detectors. For example, see the article by G. Wenke and Y. Zhu entitled "Comparison Efficiency and Feedback Characteristics of Techniques for Coupling Semiconductor Lasers to Single-Mode Fibers" in *Applied Optics*, Vol. 22, No. 23, Dec. 1, 1983, pages 3837–3844.

Small lenses with relatively high coupling efficiency may be prepared by forming a tapered fiber and heating the end of the taper, for example, with an electric arc. Etched tapered fibers are prepared by etching off the cladding from an end portion of a fiber with buffered HF resulting in a taper and subsequently forming the small lens at the end of the taper. Drawn tapered fibers are prepared by simultaneous drawing and heating of a section of a fiber in an electric arc. The length of the tapered region can be controlled by the amount of heating and by the drawing speed. After the constricted portion is melted off, electrode arc heating produces a microlens at the end of the tapered fiber. In some cases, the microlens is produced by dipping the end of the tapered fiber into a melt of high-index glass. An article by K. Mathyssek, J. Wittman and R. Keil entitled "Fabrication and Investigation of Drawn Fiber Tapers with Spherical Microlenses" in *Journal of Optical Communications*, Vol. 6 (Dec. 1985) 4, pp. 142–146, as well as U.S. Pat. No. 4,565,558 issued on Jan. 21, 1989 to R. Keil et al. and U.S. Pat. No. 4,589,897 issued on May 20, 1986 to K. Mathyssek et al., discusses drawn tapered fibers with microlenses.

However, while such lenses may possess relatively high coupling efficiency, these two processes do not lead to truly reproducible results due to a number of production inefficiencies. Among the inefficiencies are the wear of arc electrodes as the period of their use increases and a difficulty in forming lenses on certain fibers which may not be symmetrical. An example of such a fiber could be a so-called D-fiber in which a segment of the cladding is removed on one side of the fiber. Another example could be a polarization preserving fibers for which microlens formation presently is difficult if not impossible.

It is, thus, still desirable to fabricate microlenses on the optical fibers in an efficient and a controllably reproducible manner.

SUMMARY OF THE INVENTION

This invention is a process and apparatus for fabricating microlenses on optical fibers. In accordance with the invention, an end portion of an optical fiber is subjected to the action of a pulsed laser beam which in a single operation forms a taper on the end portion of the fiber and a microlens at the end of the taper. The beam ablates progressively the circumferential periphery of the end portion of the fiber into a taper with simultaneous formation of the lens. The laser and the end portion of the fiber are arranged relative each to another so that the laser beam is incident on the end portion of the fiber at an acute angle $\theta$ to the longitudinal axis of the fiber. The angle is selected to attain a desired curvature of the lens and to avoid the possibility of the lens drooping toward the laser. In the preferred embodiment the fiber which is rotated during the fabrication, is supported within a through-passage in a fiber holder, the diameter of the passage being only sufficiently greater than the diameter of the fiber to permit rotation of the fiber without either undue friction or undue peripheral movement of the fiber radially of the passage. The fiber holder is secured on a micropositioner which may be suitably controlled for moving the fiber into and through the laser beam. For precise repeatability of lens formation the micropositioner may be conveniently controlled by a computer, such as a Personal Computer (PC). The process and apparatus permits precise shaping of microlenses in a reproducible fashion.

DETAILED DESCRIPTION

Figure 1:
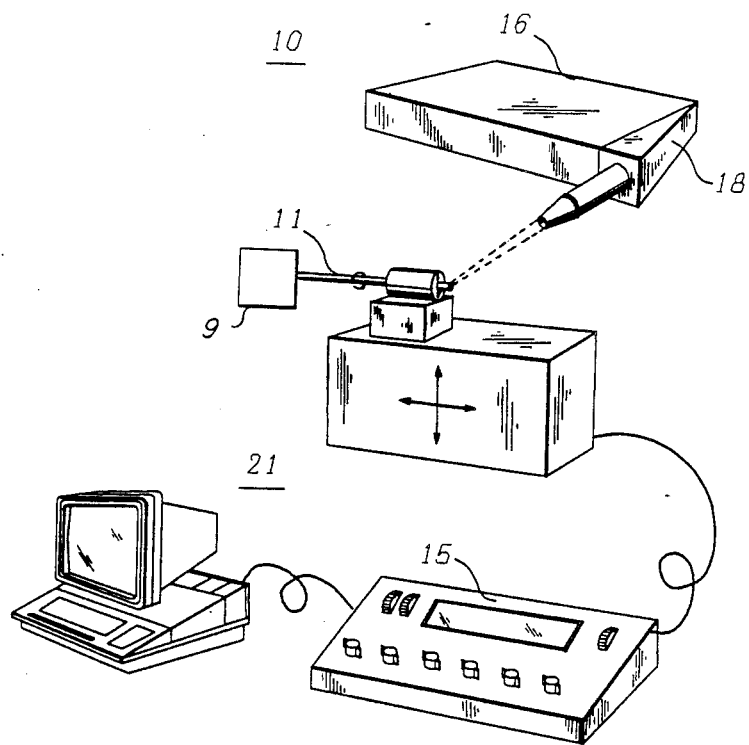
FIG. 1 discloses a laser micromachining apparatus for producing microlenses on the end of an optical fiber.
Figure 2:
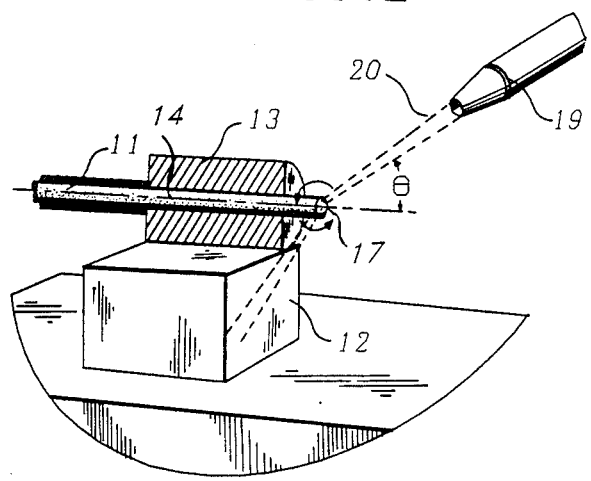
FIG. 2 discloses an enlarged view of a portion of the apparatus shown in FIG. 1.

FIGS. 1 and 2 show an exemplary embodiment of an apparatus 10 for fabrication of a microlens at the end of a single-mode optical fiber 11 in accordance with the present invention.

Apparatus 10 includes a micropositioner 12 with precision stepping arrangement, e.g. on the order of 0.1 $\mu$m, and fiber holder 13 secured to the micropositioner and provided with a through-aperture 14 having circular cross-section. The micropositioner enables movement of holder 13 and, thus, of aperture 14, in a horizontal, vertical or suitably compounded, such as diagonal, direction. The micropositioner may be controlled manually or via a controller 15.

To provide for rotation of optical fiber 11 about its longitudinal axis, the fiber is mounted in a suitable spinning device schematically shown as a block 9. Block 9 is representative of any suitable means known per se which would impart rotation to fiber 11 about its longitudinal axis, for example, a microlathe driven chuck, a small motor driven collet, etc. The fiber may be rotated within a range of from 100 to 1000 rpm. Free end portion 17 of optical fiber 11 passes through aperture 14 arranged longitudinally of holder 13 so that only a relatively short portion of the free end portion of the fiber projects from of the holder. The length of the free end portion projecting from the holder should be sufficiently long to permit formation of a microlens at the end thereof, but not so long as to result in a possible eccentricity of rotation of the portion being micromachined.

To avoid twisting of the fiber during rotation, the diameter of aperture 14 is selected to permit free rotation of the fiber within the aperture without undue friction between the fiber and the walls of the aperture. For example, the diameter of aperture 14 may be up to 2 $\mu$m greater than the diameter of fiber 11. This permits the fiber to be spun around its own axis with up to 1 $\mu$m accuracy without requiring great precision in the spinning device.

Holder 13 is shown as having only one through aperture 14. However, the holder may be provided with more than one such aperture. For example, each aperture may be of a different diameter to accommodate fibers of correspondingly different outer diameters. Alternatively, the apertures may be of the same diameter permitting loading of a plurality of fibers into the holder so that the laser micromachining may proceed from one fiber to another with a minimum loss of down time.

A pulsed laser 16, arranged in a spatial relationship to the fiber, is used for micromachining a microlens on free end portion 17 of fiber 11. Laser 16 is provided with suitable optical means 18 and 19 for focusing a laser beam 20 onto the fiber. Holder 13 and laser 16 are positioned relative each to another so that the laser beam 20 engages the fiber at an acute angle $\theta$ to the longitudinal axis of the fiber wherein generally $0° < \theta < 90°$ irrespectively whether the beam is directed toward the face of the end portion of the fiber or from the opposite direction, toward the periphery adjacent to the end portion.

The micromachining of microlenses is carried out in this exemplary embodiment using a sealed-cavity, RF waveguide $CO_2$ laser emitting 25 watts. Using radio frequency excitation, rather than spark discharge excitation, this type of laser requires no external gas source, and requires cooling only by an air-cooled heat sink (not shown) attached to the waveguide tube. The entire laser, including heat sink, is roughly 10 cm.×15 cm.×92 cm (4"×6"×36") in dimension, weighs <6.8 kg. (15 lbs.) and can be mounted directly on an optical bench. The laser is driven with an external power supply (not shown) generating the radio frequency excitation. The excitation radiation is linked in a known manner to an external modulator (not shown), enabling the laser output to be pulsed under external control with pulse times as short as ten $\mu$sec.

The laser output, at 10.6 $\mu$m wavelength, goes through a 4×beam expansion, is deflected 90 degrees at 18, and passes through focusing lens 19, such as a 7.6 cm. (2.5 inch) focal length zinc selenide lens. The focused spot radius is $\sim$ 15 $\mu$m, with the greatest energy density concentrated within a 5 $\mu$m radius spot. The focused power density is $7.1 \times 10^{-2} W/\mu m^2$ at the center of the focused spot.

U.S. Pat. No. 4,710,605 issued on Dec. 1, 1987 to H. M. Presby teaches the use of a pulsed laser beam for flash evaporating portions of the periphery of optical fibers so as to prepare taps, couplers and mode mixers directly on the fiber. A segment of the laser beam engages an outer periphery of the fiber in a direction perpendicular to the longitudinal axis of the fiber with an intensity and duration of pulses selected to progressively ablate and remove the material of the fiber without redepositon. The primary purpose of the patented process is the removal of elongated sections of the periphery of the fiber and not the forming and melting of an end of a fiber into a lens. An attempt to utilize the teachings of this patent for reproducibly manufacturing microlenses would be unsuccessful, at least due to an inability to precisely control the eccentricity of the lens position on the fiber and drooping of the lenses toward the laser.

Laser 16 is pulsed using external pulses of 30 $\mu$sec duration, at a repetition rate of 333 Hz. The duty cycle of the modulating pulses is therefore 1:100, but the time constant for turning on of the laser is roughly 30 $\mu$sec, so the time averaged power output of the laser is roughly 200 mW. The fiber is rotated within a range of from 400 to 600 rpm, preferably at about 500 rpm. These parameters yield good results with the beam characteristics used. For some other beam characteristics, suitable operating parameters may be determined by a simple trial-and-error experiment.

Optical fibers generally include a core, a cladding and an insulation. Typically, the core and the cladding comprise silica. In a single-mode or in a multi-mode optical fiber the outer diameter of the insulation is about 225 micrometers and of the cladding about 125 micrometers. The diameter of the core in a single-mode fiber is about 10 micrometers and in a multi-mode fiber about 50 micrometers. A convenient manner of positioning fiber 11 in the aperture 14 so that only a predetermined length of the fiber projects from holder 13, is by making the diameter of the aperture 14 only up to 2 $\mu$m greater than the diameter of the cladding of the fiber. In operation, the insulation of the fiber is stripped from the end portion of the fiber and the portion of the fiber without the insulation is inserted into aperture 14 so that the insulation abuts the holder and a predetermined length of the free end portion projects from the holder. The fiber may project for a distance greater than that needed for the formation of the taper with a lens thereon. Any excess length may be cut-off by means of the laser beam prior to the formation of the lens. The edge of the cladding not only limits the length of the insertion of the stripped portion of the fiber into and through the holder, but also acts as a stop against any forward movement (toward the laser beam) of the fiber in the longitudinal direction during rotation. The reverse movement of the fiber during rotation is prevented by the spinning fiber itself. The fiber is provided with a slack between the holder and the spinning device so that during rotation any tendency of the fiber for moving in the reverse direction is avoided. Numerous other ways for limiting longitudinal movement of the fiber relative to the holder may be devised. In cases where it is desired to retain the cladding, the forward movement may be restricted by means of a collar positioned on the fiber so as to predetermine the length of the fiber projecting from the holder. Alternatively, the fiber may be inserted into a tightly fitted sleeve which is rotatively positioned in the holder, while being restricted from any movement longitudinally of the holder.

In preparing a microlens at the end of a fiber, an operator strips the jacket insulation from the free end portion of the fiber to be lensed, inserts the stripped portion of the fiber into holder 13, aligns free end portion 17 of the fiber with the laser beam 20 and initiates the movement of the holder 13 so as to move the free end portion into and through the laser beam. The direction and speed of the movement of the fiber and the angle of incidence of the laser beam onto the fiber are preselected to result in a desired taper at the free end portion of the fiber and curvature of the lens being formed at the end of the taper.

Although manual or servomotor control could be sufficient for producing individual microlenses, precise repeatability of the machining operations may be obtained by computer control over, and recording of, the movement sequence. For this purpose, controller 15 is linked to a PC, denoted generally as 21, such as an AT&T PC 6300, via an RS-232 interface, over which movement control commands could be sent. A controlling program, written in GW-BASIC, allows direct operator control over the controller, direct operator control with simultaneous recording of the specified command sequence, or execution of a pre-recorded sequence of movement commands. Using this system, series of commands required for the formation of a given radius of microlenses could be stored in a data file, recalled, and executed at any time. Therefore, an operator's involvement in the microlens fabrication is reduced to stripping the insulation from the end portion of the fiber to be lensed, inserting the stripped portion of the fiber into holder 13, aligning the free end portion 17 of the fiber with laser beam 20, and running the program. The program executes the movement command sequence, and, at the end of the program execution, the microlensed fiber is removed from the holder. Total fabrication time is short, on the order of 2 minutes, limited by the transfer speed of micropositioner 12.

A particularly useful characteristic of the micromachining process is that the process simultaneously induces both ablation of the surface and heating of the underlying material. Heating is decreased by the use of shorter, more intense pulses, but is never entirely insignificant. The characteristics are beneficial, since formation of fiber microlenses requires both cutting away of cladding material and melting of the core end-face for lens curvature formation.

Upon contact with silica glass, such as that used in optical fibers fabrication, the 10.6 $\mu$m radiation of the $CO_2$ laser is absorbed essentially at the surface of the fiber. Beyond this point, two effects occur: glass at the surface is raised above its vaporization temperature ($T_{vap}$), evaporating away, and heat is conducted into the material of the fiber. The longer the surface of the fiber is maintained at $T_{vap}$, the greater is the depth of the material within the fiber which is raised above the melting temperature ($T_{melt}$) of the glass material. Sufficiently intense, short pulses can cause ablation of the surface with minimal melting of the underlying material.

Figure 3:
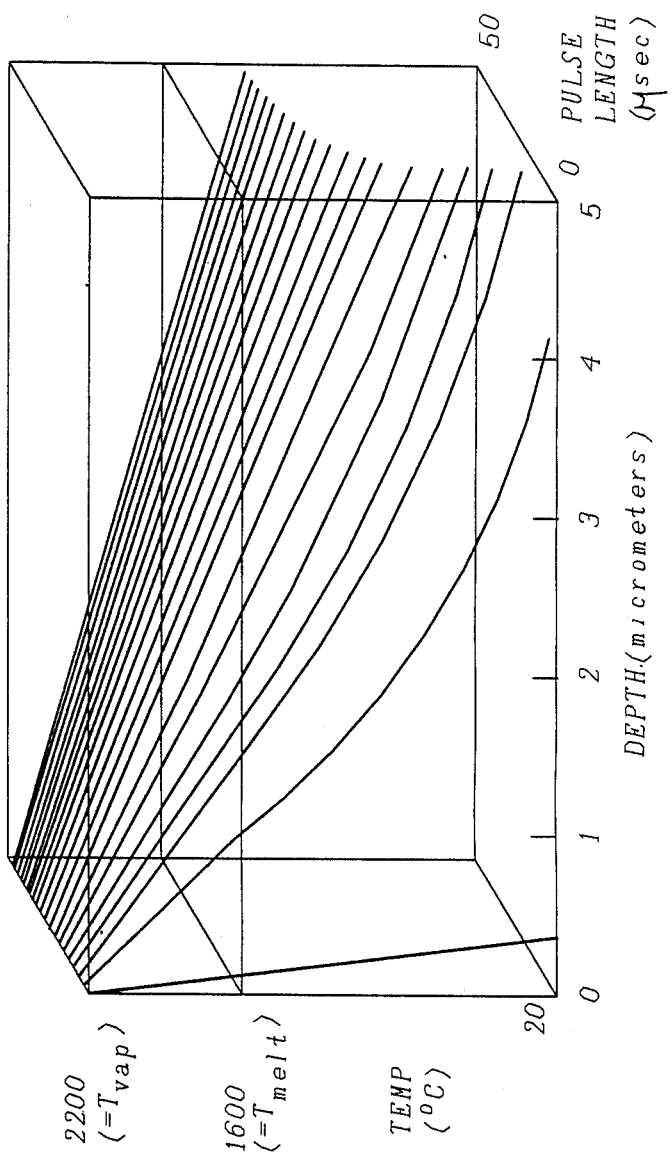
FIG. 3 discloses a three-dimensional temperature distribution in a fiber after a laser pulse for various pulse lengths.

FIG. 3 represents a three-dimensional chart of a temperature distribution in an optical fiber after a laser pulse for various pulse lengths. The chart was prepared assuming the following parameters for the beam and glass

| Beam Power | $P_{laser} =$ | 25 W |
| Focused Beam Radius | $w_o =$ | 15 $\mu$m |
| Glass Density | $\rho =$ | 2.2 gm/cm$^3$ |
| Thermal Conductivity | $\kappa =$ | 1.47 $\times$ 10$^{-2}$ J/sec. cm. °C. |
| Specific Heat | $C_p =$ | 1.05 J/gm. °C. |
| Vaporization Temperature | $T_{vap} =$ | 2000° C. |
| Melting Temperature | $T_{melt} =$ | 1600° C. |

For the 25 W laser used in the illustrative embodiment, which was focused to a Gaussian beam 15 $\mu$m spot radius, the maximum intensity $I_{max}$ incident upon an area of the glass surface with a single intense $CO_2$ laser pulse is given by $$I_{max} = \frac{P_{laser}}{\pi(\omega_o/\sqrt{2})^2} \quad (1)$$

At this intensity, the time required to bring a section of glass 1 $\mu$m deep from room temperature to the evaporation temperature (from 20 degrees C. to 2000 degrees C.), is less than 0.1 $\mu$sec, so that conductive and convective heat transfer have little time to operate. However, as the pulse goes on, heat is conducted into the fiber, causing deformation of the fiber due to surface tension acting on the liquefied glass. This shows the necessity for selecting pulses which are sufficiently intense for causing ablation of the material of the fiber and yet sufficiently short to produce the lens by heating the end portion of the fiber with minimum material deformation.

The laser lens-forming technique according to this invention may be adapted for forming lenses at an end of an etched tapered fiber or a drawn tapered fiber. To form a lens at an end of a fiber tapered by such prior art technique, the tapered fiber is inserted into aperture 14 of holder 13, and, while the fiber is being rotated, the lens is formed by applying the pulsed laser beam to the end of the etched tapered fiber in the manner described with reference to the illustrative embodiment. The use of laser heating rather than electric arc heating for etched tapered fibers or drawn tapered fibers can yield significantly more consistent microlens curvature, with minimal change in current fabrication techniques. Microlenses fabricated using the laser micromachining show excellent laser-fiber coupling, and may be more circularly symmetric than lenses formed by other techniques. For microlenses formed using the laser-melting technique of etched or drawn tapers, the laser provides a stable and consistent heat source for melting the fiber tips, resulting in greater repeatability in lens fabrication than with the electric arc-melting commonly used.

Figure 4:
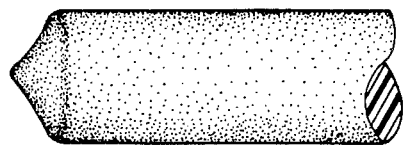
FIG. 4 discloses a schematic representation of a photograph of a $CO_2$ laser micromachined taper and microlens.
Figure 5:
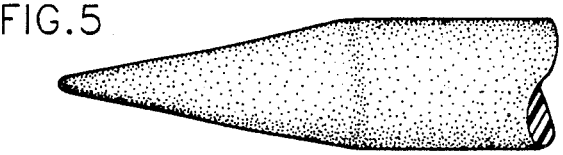
FIG. 5 discloses a schematic representation of a photograph of an etched tapered fiber and a laser melted lens.

Typical structures of laser micromachined lenses and etched-tapered laser-melted lenses are shown in FIG. 4 and 5, respectively. Assuming that the lens is centered on the fiber core and that the core is not otherwise deformed, the coupling performance for microlenses is dependent solely on the curvature at the face of the fiber surface. While the tapers shown have very different structures, the end-face curvatures of the lenses and thus their performances are nearly equivalent. The tapering of the laser machined fiber, FIG. 4, is a result of specified machining commands and could be tailored to other requirements. The long tapered section for the etched fiber shown in FIG. 5 is a result of the taper etching process and serves no useful function. It may even prove detrimental in terms of fiber strength in the tapered section.

If the rotating fiber is moved simultaneously into and through the beam, the heating that occurs in the last stages of stripping away the cladding material is sufficient to melt the fiber end, forming the type of microlens seen in FIG. 4. Thus, lens formation occurs in one sweep of the fiber through the beam, providing the sweep occurs diagonally into and through the beam. This eliminates the step of alignment of the fiber center relative to the beam center, and should make lens formation very rapid. In addition, the final microlens curvature radius formed with this method is determined by the angle of the diagonal sweep through the beam. If the sweep is perpendicular to the fiber axis, the lens formed has a very small radius of curvature, while sweeps at angles increasingly closer to the fiber axis cause increasingly large curvature radii. Once the beam parameters are determined (such as pulse length, pulse rate, power, intensity) the microlens curvature radius could be selected by merely specifying the required sweep angle and sweeping the fiber through the laser beam. Such a technique would maximally exploit the operating characteristics of laser micromachining, while decreasing the time and operator skill required for microlens fabrication.

Figure 6:
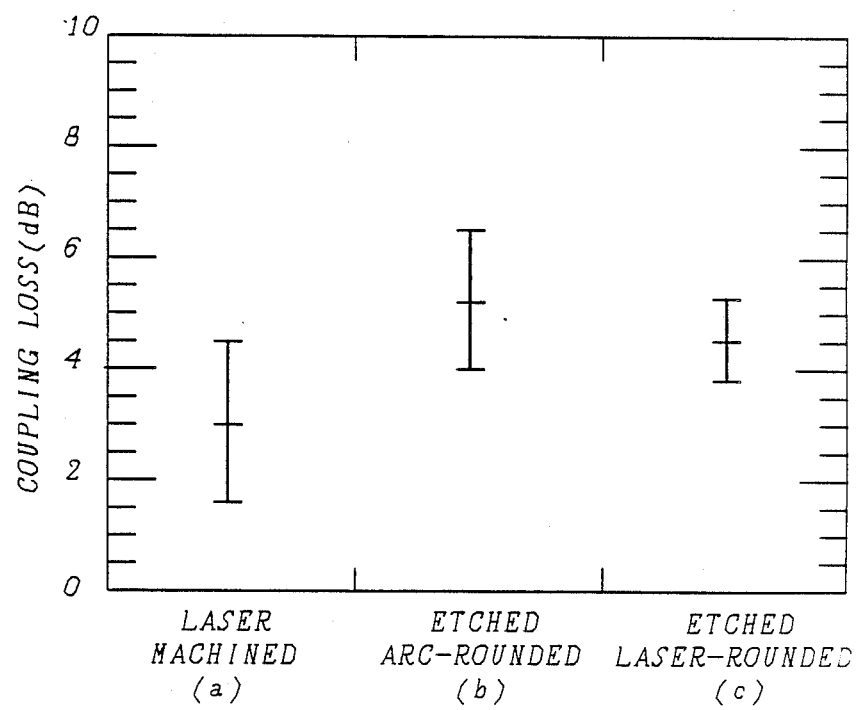
FIG. 6 discloses a comparison of measured microlens coupling loss (in dB) for three variants of microlens formation on a 5DSM Optical fiber when coupled to a 1.3 $\mu$m DCPBH Laser.

Evaluation of lens performance was conducted by aligning the lensed fibers with a calibrated Double Channel Planar Buried Heterostructure (DCPBH) semiconductor laser being used as an "injection" laser, operating at 1.3 $\mu$m, and measuring the fiber-coupled power. Three types of lenses were measured: laser micromachined lenses, etched tapered-electric arc-melted lenses and etched tapered-laser-melted lenses. Results of the evaluation are shown in FIG. 6(a, b, and c, respectively).

Comparison of laser-micromachined lenses [FIG. 6(a)] with etched tapered-electric arc-melted lenses [FIG. 6(b)] shows roughly similar variation magnitude, but with significantly better absolute coupling efficiencies for the laser-micromachined lenses. This effect is partially due to the electric arc-melted lenses not having their radii of curvature correctly matched to the injection being coupled to the laser. Also, it is common in microlens manufacture to increase slightly the microlens curvature radius to make the injection laser to fiber coupling less sensitive to optical misalignments. However, it may more likely be due to the fact that electric arc-melting of microlenses is inherently an asymmetric process, since only two electrodes are used, while the laser micromachining as described herein is inherently circularly symmetric. Asymmetric heating of the etched tapered fiber tip has been observed to cause "drooping" of the tip as surface tension acts differently on the parts of the fiber tip being melted differently. In the formation of the laser-micromachined lenses the fiber axis is not aligned perpendicularly to the laser beam, but rather at an acute angle, $\theta$, to the beam, the angle being generally $0° < \theta < 90°$ to prevent the tendency of the lenses to "droop" towards the laser. The fact that the laser micromachining is immune to this "drooping" of microlens tips may account for the resultant increased laser-fiber coupling efficiency. In the exemplary embodiment the lens, shown in FIG. 4, was fabricated with an angle of incidence, $\theta$, of the laser beam (which may also be denoted as a sweep angle) within a range of $60° < \theta < 80°$. Other angles may be selected to suit a desired lens curvature.

As seen in FIG. 6(b) and 6(c), comparison of the etched tapered-electric arc-melted lenses with etched tapered-laser-melted lenses shows a much smaller variation magnitude for the latter lenses than for the etched tapered-electric arc-melted lenses. This is due primarily to the greater consistency of position and intensity of the heat output of laser relative to the electric arc. Variation in the electric arc heating is caused by wearing away of the electrodes as the arc occurs. As the electrodes wear away, the position and intensity of the arc heating varies accordingly. In contrast, in laser heating, the position and intensity of the heating zone are significantly more consistent, especially in the long term.

The use of a $CO_2$ laser in a fiber micromachining arrangement, with movement sequences programmed under computer control, allows formation of lenses in an inherently repeatable, circularly symmetric manner. Microlens shape can be modified quickly and easily by means of the modification of a series of movement commands in a data file. Diagonal sweeping of a spinning fiber through a fixed, pulsed $CO_2$ laser beam allows simultaneous removal of cladding material and microlens formation, with the microlens curvature radius being determined by the sweep angle. Of course, the holder with the spinning fiber may be kept stationary and the laser may be moved relative to the end portion of the fiber in the similar manner and under the similar movement control as were described above with reference to the movement of the fiber.

The above-described laser micromachining technique is useful for increasing consistency, rapidity and ease of fabrication of microlenses on single-mode optical fiber. Lens radius can be controlled by controlling the angle of incidence of a laser beam on the fiber, as well as the intensity and duration of the laser pulses used for heating. In addition, it may allow for a convenient microlens fabrication on specialty fibers, such as polarization preserving fibers, for which microlens formation is presently difficult and for some structures is even impossible.

In the foregoing discussion, it is to be understood that the above-desired embodiment and method of operation are simply illustrative of an apparatus and a method for fabricating a microlens on an optical fiber. Other suitable variations and modification could be made to the method and apparatus described herein, and still remain within the scope of the present invention. For example, an excimer laser such as an ultraviolet (UV) excimer laser may be used in place of $CO_2$ laser operating at 10.6 $\mu$m.

I claim:

1. A method of micromachining lenses on an end portion of an optical fiber, which comprises
   aligning an end portion of an optical fiber and a focused laser beam such that said laser beam is at an angle $\theta$ to the longitudinal axis of the end portion of the fiber, wherein $0° < \theta < 90°$,
   rotating the optical fiber about its longitudinal axis with any peripheral movement of the end portion of the fiber radially of said axis being restricted to less than 2 $\mu$m,
   pulsing said laser beam at a pulse rate and for a pulse duration resulting in ablation of surface material of the fiber by the laser beam incident thereon and in sufficient heating of the material of said end portion to cause formation of a lens at the end of the fiber, and
   moving the end portion of the fiber into and through the laser beam so as to form a taper at the end portion of said fiber and a microlens at the end of the taper.

2. The method of claim 1 in which said angle $\theta$ is $60° < \theta < 80°$.

3. The method of claim 1 in which said laser beam is produced by a $CO_2$ laser with a wavelength of 10.6 μm.

4. The method of claim 1 in which said laser beam is produced by an excimer laser.

5. The method of claim 1 in which said fiber is rotated about its axis at a speed within a range of from 100 to 1000 rpm.

6. The method of claim 1 in which said fiber is rotated about its axis at a speed within a range of from 400 to 600 rpm.

7. The method of claim 1 in which said peripheral movement of the fiber is restricted to less than 1 μm.

8. The method of claim 1 in which said optical fiber includes a core and cladding comprised of fused silica.

9. The method of claim 1 in which said pulse duration is about ten microseconds.

10. The method of claim 1 in which said fiber is a single-mode fiber.

11. The method of claim 1 in which, prior to the aligning step, insulation is stripped from a preselected length of the end portion of the fiber, and the stripped portion of the fiber is inserted into and through an aperture in a holder, permitting a free end of the fiber to project from the holder a distance at least sufficient for the formation of the lens thereon.

12. An apparatus for producing microlenses at an end of an optical fiber, which comprises
 a laser device for producing a focused pulsed laser beam,
 a holder having at least one through aperture for receiving an optical fiber therein so that the end portion of the fiber projects from one face of said holder at least a distance needed for producing a taper with a microlens thereon, the diameter of the aperture being large enough to permit free rotation of the fiber therein about its longitudinal axis, the holder and the laser device being positioned relative each to another so that said laser beam is at an angle $\theta$ to the longitudinal axis of said end portion of the optical fiber wherein $0° < \theta < 90°$, and
 a positioning device for positioning and moving the holder relative to the laser beam so as to engage the end portion of the fiber with the pulsed laser beam and to move the said end portion into and through the pulsed laser beam, said laser beam capable of being pulsed at a rate and for a duration of pulses sufficient to cause ablation of surface material of the fiber and simultaneous heating of the material of the end portion of the fiber so as to form a taper at said end portion and a microlens at the end of the taper.

13. The apparatus of claim 12 in which said angle $\theta$ is $60° < \theta < 80°$.

14. The apparatus of claim 12 in which a means is provided for causing rotation of the fiber about its axis at a speed within a range of from 100 to 1000 rpm.

15. The apparatus of claim 12 in which the diameter of said aperture in the holder is permitted to be up to 2 μm greater than the diameter of said fiber.

16. The apparatus of claim 12 in which said laser beam is produced by a $CO_2$ laser with a wavelength of 10.6 μm.

17. The apparatus of claim 12 in which said laser beam is produced by an excimer laser.

18. A method of micromachining lenses on an end portion of an optical fiber, which comprises
 aligning an end portion of an optical fiber and a focused laser beam such that said laser beam is at an angle $\theta$ to the longitudinal axis of the end portion of the fiber, wherein $0° < \theta < 90°$,
 causing rotary motion relative each to another of said laser beam and said optical fiber about said longitudinal axis,
 pulsing said laser beam at a pulse rate and for a pulse duration sufficient to result in ablation of surface material of the fiber by the laser beam incident thereon and heating of the material of said end portion to cause formation of a lens at the end of the fiber, and
 moving relative each to another the laser beam and the end portion of the fiber so that the laser beam engages the end portion of the fiber and forms a taper at the end portion of said fiber and a microlens at the end of the taper.

19. The method of claim 18 in which said angle $\theta$ is $60° < \theta < 80°$.

20. The method of claim 18 in which said laser beam is produced by a $CO_2$ laser with a wavelength of 10.6 μm.

21. The method of claim 18 in which said laser beam is produced by an excimer laser.

22. The method of claim 18 in which said optical fiber is rotated about its longitudinal axis with any peripheral movement of the end portion of the fiber radially of said axis being restricted to less than 2 μm.

23. The method of claim 22 in which said peripheral movement of the fiber is restricted to less than 1 μm.

24. The method of claim 18 in which said fiber is rotated about its longitudinal axis at a speed within a range of from 100 to 1000 rpm.

25. The method of claim 18 in which said fiber is rotated about its longitudinal axis at a speed within a range of from 400 to 600 rpm.

26. The method of claim 18 in which said optical fiber includes a core and cladding comprised of fused silica.

27. The method of claim 18 in which said optical fiber is a single-mode fiber.

28. The method of claim 18 in which said pulse duration is about ten microseconds.

29. The method of claim 18 in which, prior to the aligning step, insulation is stripped from a preselected length of the end portion of the fiber, and the stripped portion of the fiber is inserted into and through an aperture in a holder permitting a free end of the fiber to project from the holder a distance at least sufficient for the formation of the lens thereon.

30. The method of claim 18 in which said end portion of the fiber is moved into and through the pulsed laser beam to form the taper at the end portion of the fiber and a microlens at the end of the taper.

31. An apparatus for producing microlenses at an end of an optical fiber, which comprises
 a laser device for producing a focused pulsed laser beam,
 a holder having at least one through aperture for receiving an optical fiber therein so that the end portion of the fiber projects from one face of said holder a distance at least sufficient for producing a taper with a microlens thereon, the holder and the laser device being positioned relative each to another so that said laser beam is at an angle $\theta$ to the longitudinal axis of said end portion of the optical fiber wherein $0° < \theta < 90°$, and
 a positioning device for positioning and moving relative each to another the holder and the laser beam so as to engage the end portion of the fiber with the pulsed laser beam and to pass the said end portion into and through the pulsed laser beam, said laser beam capable of being pulsed at a rate and for a duration of pulses sufficient to cause ablation of surface material of the fiber and simultaneous heating of the material of the end portion of the fiber so as to form a taper at said end portion and a microlens at the end of the taper.

32. The apparatus of claim 31 in which said angle $\theta$ is $60° < \theta < 80°$.

33. The apparatus of claim 31 in which the diameter of said apertue in the holder is permitted to be up to 2 $\mu$m greater than the diameter of said fiber.

34. The apparatus of claim 31 in which a means is provided for causing rotation of the fiber about its axis at a speed within a range of from 100 to 1000 rpm.

35. The apparatus of claim 31 in which the diameter of the aperture is large enough to permit free rotation of the fiber therein about its longitudinal axis.

36. The appartus of claim 29 in which said laser beam is produced by a $CO_2$ laser with a wavelength of 10.6 $\mu$m.

37. The apparatus of claim 29 in which said laser beam is produced by an excimer laser.

* * * * *